(12) United States Patent
Kaiho et al.

(10) Patent No.: US 10,382,633 B2
(45) Date of Patent: Aug. 13, 2019

(54) DATA COLLECTION SERVER, DEVICE, AND DATA COLLECTION AND TRANSMISSION SYSTEM

(71) Applicant: SEIKO EPSON CORPORATION, Tokyo (JP)

(72) Inventors: Hiroshi Kaiho, Nagano (JP); Kyoichi Kamijima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 15/822,470

(22) Filed: Nov. 27, 2017

(65) Prior Publication Data

US 2018/0160010 A1 Jun. 7, 2018

(30) Foreign Application Priority Data

Dec. 2, 2016 (JP) ................. 2016-234856

(51) Int. Cl.
| | | |
|---|---|---|
| *H04N 1/00* | (2006.01) | |
| *H04N 1/32* | (2006.01) | |
| *H04L 29/08* | (2006.01) | |
| *G06F 3/12* | (2006.01) | |
| *H04L 12/26* | (2006.01) | |

(52) U.S. Cl.
CPC ....... *H04N 1/00344* (2013.01); *G06F 3/1229* (2013.01); *H04L 43/065* (2013.01); *H04L 43/0817* (2013.01); *H04L 67/34* (2013.01); *H04N 1/00923* (2013.01); *H04N 1/32122* (2013.01); *H04L 67/10* (2013.01); *H04N 2201/0094* (2013.01); *H04N 2201/3202* (2013.01); *H04N 2201/3205* (2013.01)

(58) Field of Classification Search
CPC combination set(s) only.
See application file for complete search history.

(56) References Cited

U.S. PATENT DOCUMENTS

| | | |
|---|---|---|
| 2007/0250182 A1 | 10/2007 | Demachi et al. |
| 2009/0070449 A1 | 3/2009 | Tanaka et al. |

(Continued)

FOREIGN PATENT DOCUMENTS

| | | |
|---|---|---|
| CN | 1894901 A | 1/2007 |
| CN | 101388894 A | 3/2009 |

(Continued)

OTHER PUBLICATIONS

P. Niblett et al.; "Events and service-oriented architecture: The OASIS Web Services Notification specifications", IBM Systems Journal; vol. 44, No. 4; Oct. 26, 2005; pp. 869-886.

(Continued)

*Primary Examiner* — Barbara D Reinier

(57) ABSTRACT

Quickly transmitting and acquiring device information is enabled. A data collection server has a receiver that receives device information related to device states; an evaluator configured to determines if the received device information is first device information that is not an object of priority transmission, or second device information that is an object of priority transmission; and a transmitter configured to send the received device information to a management server that manages the device information. The transmitter transmits the second device information to the management server with priority over the first device information.

3 Claims, 7 Drawing Sheets

(56) References Cited

U.S. PATENT DOCUMENTS

2009/0070458 A1* 3/2009 Fuse ................. H04L 12/56
709/224
2016/0292772 A1* 10/2016 Nagasaki ........... G06Q 30/0633

FOREIGN PATENT DOCUMENTS

| CN | 202448512 U | 9/2012 |
| CN | 202854485 U | 4/2013 |
| JP | 3651612 B1 | 5/2005 |
| JP | 2016-045550 S | 4/2016 |

OTHER PUBLICATIONS

The Extended European Search Report for the corresponding European Patent Application No. 17204991.8 dated May 22, 2018.

* cited by examiner

|  |  | 2016 OCTOBER 31 | 2016 OCTOBER 31 | 2016 NOVEMBER 1 |
|  |  | 15:00 (SCHEDULED TRANSMISSION) | 20:00 (ON-DEMAND TRANSMISSION) | 15:00 (SCHEDULED TRANSMISSION) |
| --- | --- | --- | --- | --- |
| DISPLAYED PAGE COUNT | MONOCHROME | 900 | 1000 | 100 |
|  | COLOR | 400 | 500 | 100 |
| CURRENT TOTAL PRINTED PAGE COUNT | MONOCHROME | 2900 | 3000 | 3100 |
|  | COLOR | 1400 | 1500 | 1600 |
| PREVIOUS TOTAL PRINTED PAGE COUNT | MONOCHROME | 2000 | 2000 | 3000 |
|  | COLOR | 1000 | 1000 | 1500 |

FIG. 7

DATA COLLECTION SERVER, DEVICE, AND DATA COLLECTION AND TRANSMISSION SYSTEM

BACKGROUND

1. Technical Field

The invention relates to a data collection server that transmits and collects device information, a device, and a data collection and transmission system.

2. Related Art

JP-A-2016-45550 describes a system in which a monitoring device activates at a regular interval, such as once a day, week, or month, acquires consumables information, such as the remaining ink level, from a printer being managed, and sends the consumables information to a consumables management server.

When a device error occurs, for example, the device user may want to quickly report device information identifying the current device state to a service provider (a business that manages devices and provides user support). In order to resolve the error, the service provider may also want to immediately acquire device information for the device used by the user.

However, a configuration such as described above that sends information about a device (such as a printer) at a regular predetermined interval to a consumables management server is unable to meet the need to quickly send such device information or quickly acquire such device information.

SUMMARY

The present invention is directed to solving this problem, and provides a data collection server, device, and data collection transmission system enabling quickly transmitting and acquiring such device information.

One aspect of the invention is a data collection server including: a receiver that receives device information related to device states; an evaluator configured to determines if the received device information is first device information that is not an object of priority transmission, or second device information that is an object of priority transmission; and a transmitter configured to send the received device information to a management server that manages the device information. The transmitter transmits the second device information to the management server with priority over the first device information.

Thus comprised, if the received device information is second device information, the data collection server transmits the second device information to the management server with priority over the first device information. As a result, the desire to quickly transmit the device information, or to quickly acquire device information, can be met.

In a data collection server according to another aspect of the invention, the evaluator determines the received device information is second device information when specific identification information indicating an object of priority transmission is contained in the received device information.

Thus comprised, the data collection server can easily differentiate first device information and second device information.

In another aspect of the invention, the transmitter sequentially sends the first device information received from the multiple devices through a first communication path to the management server, and sends the second device information to the management server using a second communication path different from the first communication path.

Thus comprised, by instantiating a second communication path for transmitting second device information separately from the normal communication path (first communication path) for transmitting first device information sequentially, the data collection server can easily transmit second device information to the management server before first device information.

The technical concept of the invention can also be expressed by various modes other than a data collection server. For example, the foregoing device, the data collection server, and a system including the device, can embody the invention. Another aspect of the invention, for example, is a data collection and transmission system including: a device configured to transmit device information related to a state of the device; and a data collection server configured to receive the device information. The data collection server includes an evaluator configured to determines if the received device information is first device information that is not an object of priority transmission, or second device information that is an object of priority transmission; and a transmitter configured to send the received device information to a management server that manages the device information; and the transmitter transmits the second device information to the management server with priority over the first device information.

Another aspect of the invention is a device configured to transmit device information related to a device state to a data collection server that collects the device information; send first device information to the data collection server at a predetermined timing; and when a specific user operation is received, transmits second device information differentiable from the first device information to the data collection server in response to the user operation.

Thus comprised, the device sends device information to the data collection server according to a predetermined timing (such as a regular schedule), and transmits device information to the data collection server in response to a specific user operation. As a result, the user desire to transmit device information immediately can be met.

In another aspect of the invention, the device receives time information from the data collection server before transmitting device information; corrects the time information kept by the device based on the received time information; and transmits the device information with time information for the device information based on the corrected time information to the data collection server.

Thus comprised, when device information is generated by each device can be managed based on the time kept by the data collection server.

In another aspect of the invention, the device is a printer, and further stores a total printed page count, which is the total number of printed pages during a previous counting period and the current counting period, and a previous total printed page count, which is the total number of pages printed through the previous counting period; and displays the number of pages printed in the current counting period based on the total printed page count and the previous total printed page count.

Thus comprised, the device user can be accurately informed of the number of pages printed in the current counting period.

The invention can also be expressed as a method comprising the steps and processes executed by the server and devices described above; a program causing hardware (a computer) to execute the steps; and a computer-readable storage medium storing such a program.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 shows an example of the change in the number of pages printed by the device.

DESCRIPTION OF EMBODIMENTS

A preferred embodiment of the present invention is described below with reference to the accompanying figures. Note that the figures show an example used to describe the invention.

1. Basic System Configuration

Figure 1:
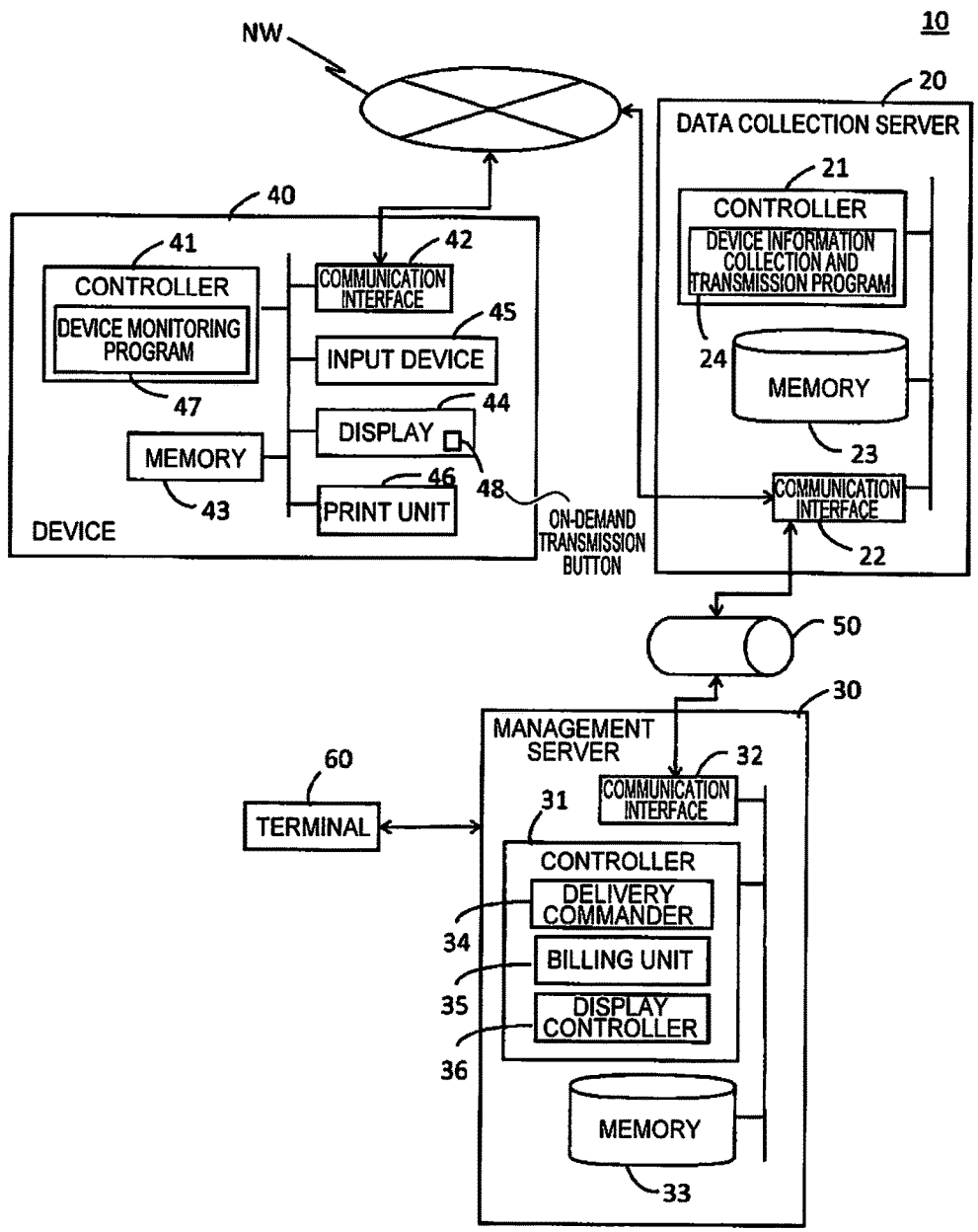
FIG. 1 schematically illustrates the configuration of a system according to the invention.

FIG. 1 schematically illustrates a system 10 according to this embodiment of the invention. The system 10 includes a data collection server 20 that collects and transmits device information related to the state of a device 40, and a management server 30 the receives and manages the device information from the data collection server 20. The system 10 also includes a device 40 that is managed. FIG. 1 shows only one device 40, but the system 10 supposes that there are multiple devices 40 to manage. The device 40 in this example is a printer. The printer is a device with at least the ability to function as a printer, but may be a multifunction device also including scanner and fax machine functions. The device 40 anticipated by this embodiment of the invention is not limited to a printer, and may be any device capable of sending device information indicating the state of the device to an external server. All or part of the system 10 may also be referred to as a data collection and transmission system, a device management system, or a consumables management system. The data collection server 20 may also be referred to as data collection and transmission server.

The devices 40 and data collection server 20 communicate through a network NW. The network NW in this example includes a local area network (LAN) and the Internet. The network NW may also be a wired network or a wireless network. The data collection server 20 and management server 30 can also communicate with each other over a data bus 50. Connected to the management server 30 is a terminal 60 operated by an operator associated with the service provider that administers the management server 30. The terminal 60 in this example is a personal computer (PC).

The device 40 includes a controller 41, communication interface 42, memory 43, display 44, input device 45, and print unit 46.

The controller 41 includes IC devices such as a CPU, ROM, RAM, or other storage device. The controller 41 controls the behavior of the print unit 46 and other parts of the device 40 by the CPU executing the processes of firmware or a program stored in ROM using RAM as working memory, for example. A device monitoring program 47 is installed to the controller 41 as one type of such a program.

The communication interface 42 is a general term for an interface enabling communicating through the network NW with an external device according to a specific communication protocol.

The memory 43 is embodied by nonvolatile memory or other storage device, or part of the controller 41.

The display 44 is a means of presenting visual information, and may be an LCD device or OLED device, for example. The display 44 may be configured to include a display and a drive circuit for driving the display.

The input device 45 is a means enabling the user to input information and commands, and may embodied by a touch panel, physical buttons, a keyboard, or other device. The display 44 may obviously also function as a touch panel. The input device 45 and display 44 in this case may be referred to as an operating panel. In this example, the operating panel of the device 40 has an on-demand transmission button 48. The on-demand transmission button 48 may be a virtual button displayed on the touch panel of the display 44, or a physical button.

The print unit 46 is a mechanism for printing based on print data, and in this example prints by an inkjet method. The printing method of the print unit 46 is obviously not limited to inkjet, and may be an electrophotographic print mechanism. The configuration of the print unit 46 is known from the literature, and detailed description is omitted.

The device information related to the state of the device 40 may include device identification information for identifying the device 40, and date information indicating when the device 40 generated the device information, in the consumables information and error information for the device 40.

The consumables information in this example includes the total number of color pages printed by the print unit 46, the total number of monochrome pages printed by the print unit 46, the remaining ink level in each ink cartridge (or ink bottle) of the print unit 46, the remaining service life of parts such as the conveyance rollers, and the remaining capacity in the waste ink tank.

The error information is information for reporting various kinds of problems that may occur in the print unit 46 (such as paper jams). Based on the output of sensors and counters of the print unit 46, the controller 41 of the device 40 constantly writes the most recent consumables information and error information to memory 43. The device identification information may be any information uniquely identifying an individual device 40 in the system 10. The device identification information may be the serial number of the device 40, for example.

The data collection server 20 includes a controller 21, communication interface 22, and memory 23. The data collection server 20 is embodied by one or more data processing devices functioning as a server. The controller 21 includes IC devices such as a CPU, ROM, RAM, or other storage device. The controller 21 controls the behavior of the data collection server 20 by the CPU executing the processes of firmware or a program stored in ROM using RAM as working memory, for example. A device information collection and transmission program 24 is installed to the controller 21 as one type of such a program.

The communication interface 22 is a general term for an interface enabling communicating with an external device according to a specific communication protocol.

The memory 23 is embodied by a hard disk drive, flash memory, or other storage (memory) device, or by part of the controller 21, for example. The device information transmitted from the devices 40 is temporarily stored in memory 23.

Similarly to the data collection server 20, the management server 30 is embodied by one or more data processing devices functioning as a server, and includes a controller 31, communication interface 32, memory 33. The controller 31 may also function as a delivery commander 34 for instructing delivery of a consumable, a billing unit 35 for calculating the amount to bill a user, and a display controller 36 for displaying device information that is stored in memory 33 for each device 40 on the display (not shown in the figure) of the terminal 60.

The delivery commander 34 determines, based on a ratio between the consumables information for each device 40 stored in memory 33 and a predetermined threshold, whether or not replenishing a particular consumable (such as ink) is necessary (refer also to JP-A-2016-45550). Based on the decision, the delivery commander 34 instructs the delivery department of the service provider or a third party, for example, to supply the consumable (deliver the consumable) to the device 40 requiring replenishment of the consumable. As a result of this instruction, the consumable the user device 40 requires replenishing is delivered to the user registered on the management server 30 as related to the device 40.

At a predetermined billing interval (such as a specific date once a month), the billing unit 35 calculates the invoice amount for each device 40 based on the consumables information (for example, based on the total number of color pages and monochrome pages printed in the one month) stored in the memory 33 for each device 40 (see also JP-A-2016-45550). The calculated invoice amount is then reported to the user of each device 40 and then paid by some method.

The operator can provide support to users while viewing the device information displayed on the display of the terminal 60 by the display controller 36. For example, the operator can provide information helpful to the user, such as how to resolve an error that has occurred on a particular device 40, by reviewing the device information for the device 40 on the terminal 60 while talking with the device 40 user by telephone.

2. Device Information Transmission by the Device

The device information transmission process of the device 40 is described next. In this embodiment, the device information transmission process of the device 40 includes a scheduled transmission process that is executed at a predetermined time, and an on-demand transmission process triggered by a specific user operation of the on-demand transmission button 48 (such as by pushing (or tapping, clicking, or otherwise operating) the on-demand transmission button 48).

Figure 2:
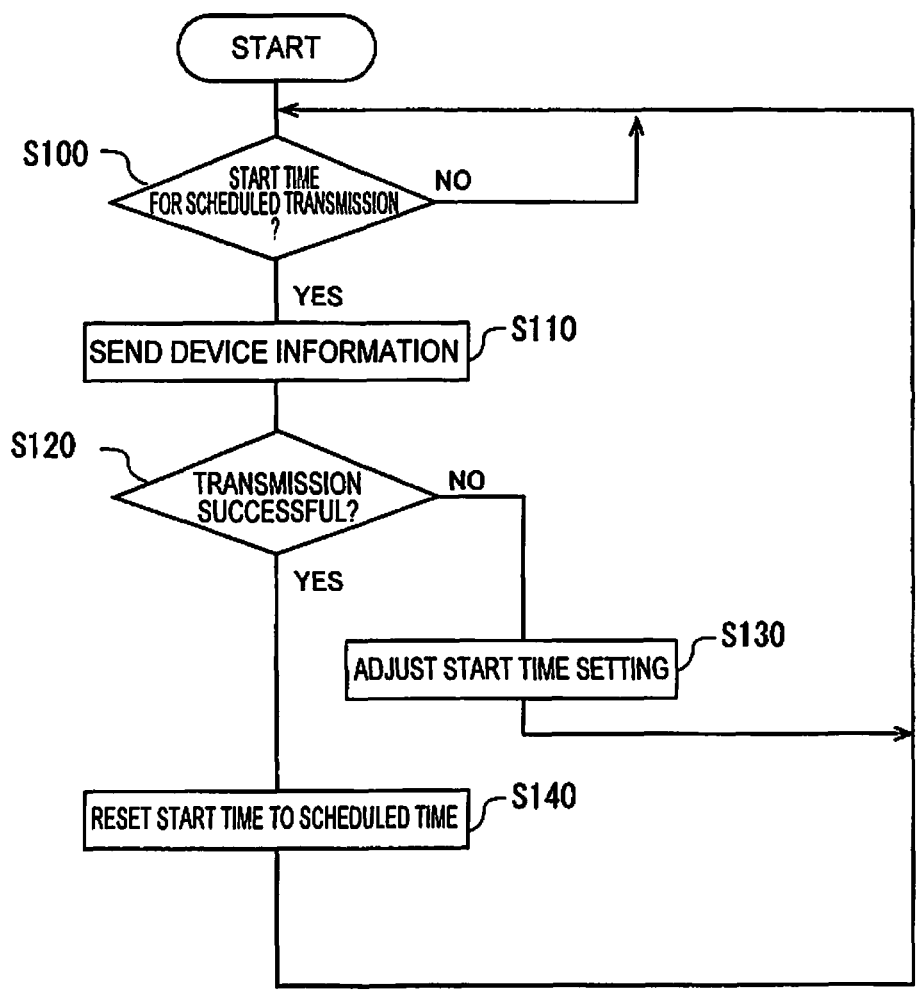
FIG. 2 is a flow chart of a scheduled transmission process executed by a device.

FIG. 2 is a flow chart of the scheduled transmission process executed by the controller 41 of the device 40 according to the device monitoring program 47. In the example in FIG. 2, the controller 41 transmits the device information for the device 40 at a predetermined time (scheduled time) once a day. The scheduled time can be set as desired according to the business convenience of the user. A different scheduled time may also be set for each device 40 in the system 10.

The controller 41 determines if it is time to start the scheduled transmission process (step S100). The start time of the scheduled transmission process is stored at a specific address in the memory of the device 40, and when the current time reaches the set start time, the controller 41 returns Yes in step S100 and then goes to step S110. The start time of the scheduled transmission process is basically a fixed time, and in this example if the time after the time is corrected in step S130 described below.

In step S110, the controller 41 sends the device information. Step S110 is described in detail below with reference to FIG. 3.

Figure 3:
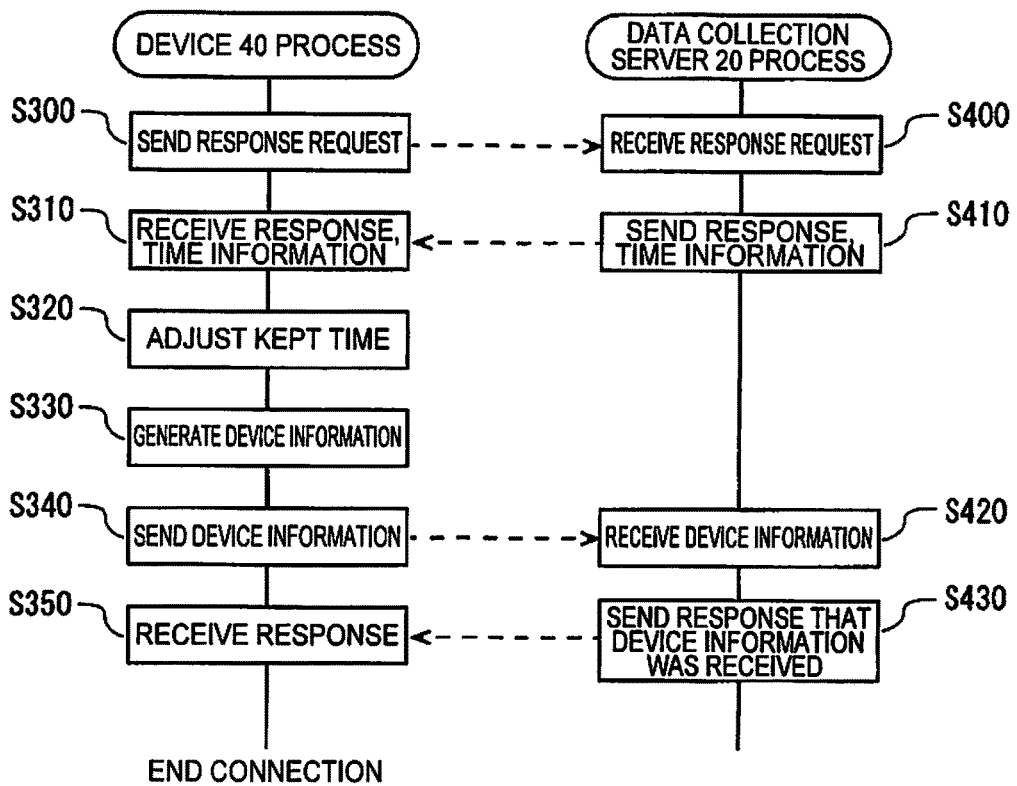
FIG. 3 is a flow chart of the device-side process and data collection server-side process related to sending and receiving device information.

FIG. 3 is a flow chart of the process executed by the device 40 and the process executed by the data collection server 20 when sending and receiving device information. The process on the device 40 side in FIG. 3 describes step S110 in detail. The process on the device 40 side in FIG. 3 also describes step S210 in FIG. 4 in detail.

The controller 41 opens a connection to the data collection server 20 through the network NW, and sends a response request (step S300). This response request is, for example, an HTTPS (Hyper Text Transfer Protocol Secure) request. More specifically, HTTPS is used for communication between the device 40 and data collection server 20 in the example in FIG. 3. However, various communication protocols may be used, such as SMTP (Simple Mail Transfer Protocol), HTTP (Hyper Text Transfer Protocol), or XMPP (Extensible Message and Presence Protocol).

The controller 21 of the data collection server 20 then receives the response request from the device 40, (step S400), and returns a response to the device 40 that sent the response request that was received (step S410). The controller 21 includes time information known to the controller 21 (such as the current time expressed in UTC (Universal Coordinated Time) in the response.

When a response from the data collection server 20 is received (step S310), the controller 41 corrects its own time information based on the time information reported in the received response (step S320). More specifically, the controller 41 corrects the current time kept by its on-board real-time clock (RTC) according to the time information received in the response. As a result, deviation between the time kept by the device 40 and the time kept by the data collection server 20 is eliminated.

Next, the controller 41 generates the device information (step S330). The controller 41 acquires the latest consumables information and error information written to memory 43. The controller 41 then generates device information including the consumables information and error information, as well as device identification information for the device 40, the time the consumables information and error information were acquired (that is, when the device information was generated). The device information generation time is the time the device information was generated based on the time information corrected in step S320. The controller 41 generates the device information as an XML file written in XML (eXtensible Markup Language) in this embodiment. Note that the file format is not limited to XML, and a file in JSON (JavaScript Object Notation) may be used.

The controller 41 then sends the generated device information to the data collection server 20 (step S340). The controller 21 receives the device information from the device 40 (step S420), and returns a response indicating the device information was received to the device 40 that sent the received device information (step S430). After sending the device information, the controller 41 then receives the response from the data collection server 20 indicating the device information was received (step S350). As a result, the controller 41 cuts the connection to the data collection server 20, and ends the process of the flow chart shown in FIG. 3. In other words, when a response from the data collection server 20 indicating that the device information was received is received (such as within a specific time after sending the device information), the controller 41 can confirm that device information transmission in step S110 (FIG. 2) was successful.

Referring again to FIG. 2, in step S120 controller 41 determines whether or not transmission of the device information in the most recent step S110 was successful. If device information transmission is determined successful (step S120: Yes), control goes to step S140. If device information transmission is determined to have failed (step S120: No), control goes to step S130.

In step S130, the controller 41 corrects the setting of the start time of the scheduled transmission process. For example, the controller 41 may set the start time of the scheduled transmission process to the start time of the scheduled transmission process stored in specific memory plus one hour. After step S130, control returns to step S100. Therefore, in step S110 after executing step S130 and S100, the controller 41 tries to send the device information again at a time later than the scheduled time. For convenience, the period from when No is first returned in step S120 to when Yes is then returned in step S120 is referred to below as the scheduled transmission process retry period.

In step S140, the controller 41 resets the start time of the scheduled transmission process to the original time. In other words, if the start time of the scheduled transmission process currently stored in memory is not the specified time, the start time is reset to the specified time. After step S140, control returns to step S100. As a result, at the scheduled time the next day, step S100 returns Yes and control goes to step S110. By each device 40 in the system 10 repeating the process in FIG. 2, each device 40 will send device information for itself to the data collection server 20 at substantially the scheduled time at a pace of approximately once a day.

Figure 4:
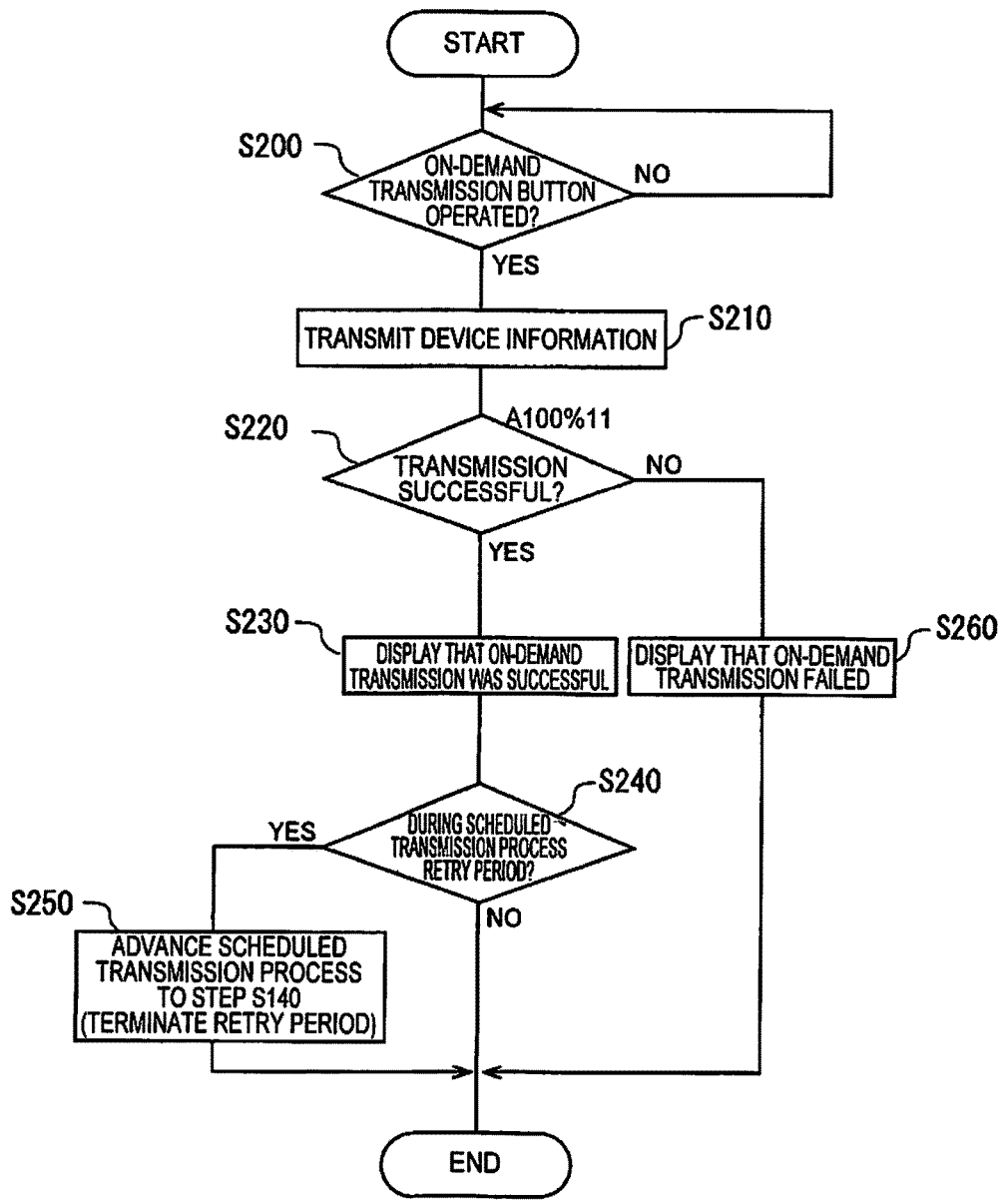
FIG. 4 is a flow chart of the on-demand transmission process executed by the device.

FIG. 4 is a flow chart of the on-demand transmission process the controller 41 of the device 40 executes according to the device monitoring program 47. The on-demand transmission process is independent of the scheduled transmission process shown in FIG. 2.

The controller 41 determines if the on-demand transmission button 48 was pressed (step S200). The user can press the on-demand transmission button 48 at any desired time. Typically, the user presses the on-demand transmission button 48 of the device 40 when the user notices that an error occurred on the device 40 being used. When the controller 41 detects operation of the on-demand transmission button 48, step S200 returns Yes and control goes to step S210.

In step S210, the controller 41 sends the device information. Step S210 is basically the same as step S110 (shown in FIG. 2) described above. However, step S210 differs from step S110 in that device information including specific identification information (priority identification information) indicating that transmitting the device information is prioritized, that is, that the device information is being sent by the on-demand transmission process, is sent to the data collection server 20 when transmitting the device information (in step S340 in FIG. 3).

Note that device information including this priority identification information is an example of second device information, and normal device information not including the priority identification information is an example of first device information.

The priority identification information may be any information causing the data collection server 20 to recognize that the device information is not transmitted by the scheduled transmission process. For example, when generating the device information as an XML file (in step S330 in FIG. 3), in step S210, the controller 41 writes a specific string equivalent to the priority identification information in the header of the XML file, and sends the XML file (device information) containing the specific string in the header to the data collection server 20 (step S340 in FIG. 3).

In step S220, the controller 41 determines if device information transmission in step S210 was successful. If device information transmission was successful, control goes to step S230; if device information transmission failed, control goes to step S260.

In step S230, the controller 41 displays that the on-demand transmission process was successful (such as by displaying a message or illustration) on the display 44. As a result, the user knows that sending the device information by pressing the on-demand transmission button 48 was successful.

After step S230, in step S240, the controller 41 determines if the current time is during the scheduled transmission process retry period. If the scheduled transmission process (FIG. 2) executed parallel to the on-demand transmission process (FIG. 4) is in the retry period, step S240 returns Yes, and control goes to step S250. If the scheduled transmission process (FIG. 2) is not in the retry period, step S240 returns No, and the on-demand transmission process (FIG. 4) ends.

In step S250, the controller 41 terminates the retry period of the scheduled transmission process (FIG. 2) running parallel to the on-demand transmission process (FIG. 4), advances to step S140, and then ends the on-demand transmission process (FIG. 4). In other words, if transmitting the device information by the on-demand transmission process during the scheduled transmission process retry period was successful, there is little need to continue the retry period and again send the device information the same day. As a result, the controller 41 unconditionally ends the retry period, enabling transmission at the scheduled time the next day. This reduces the load on the data collection server 20 that receives device information from the devices 40 in the system 10.

In step S260, the controller 41 displays on the display 44 information (such as a message or illustration) indicating that the on-demand transmission process failed, and then ends the on-demand transmission process (FIG. 4). The controller 41 may also display a specific error code, for example, indicating a device information transmission error. As a result, the user can know that sending the device information by pressing the on-demand transmission button 48 was not successful, and the cause. Note that the on-demand transmission process does not include the concept of retrying the scheduled transmission process. This is because the user can press the on-demand transmission button 48 any number of times as desired.

3. Device Information Transmission by the Data Collection Server

A process whereby the data collection server 20 sends device information received from each device 40 to the management server 30 is described next.

Figure 5:
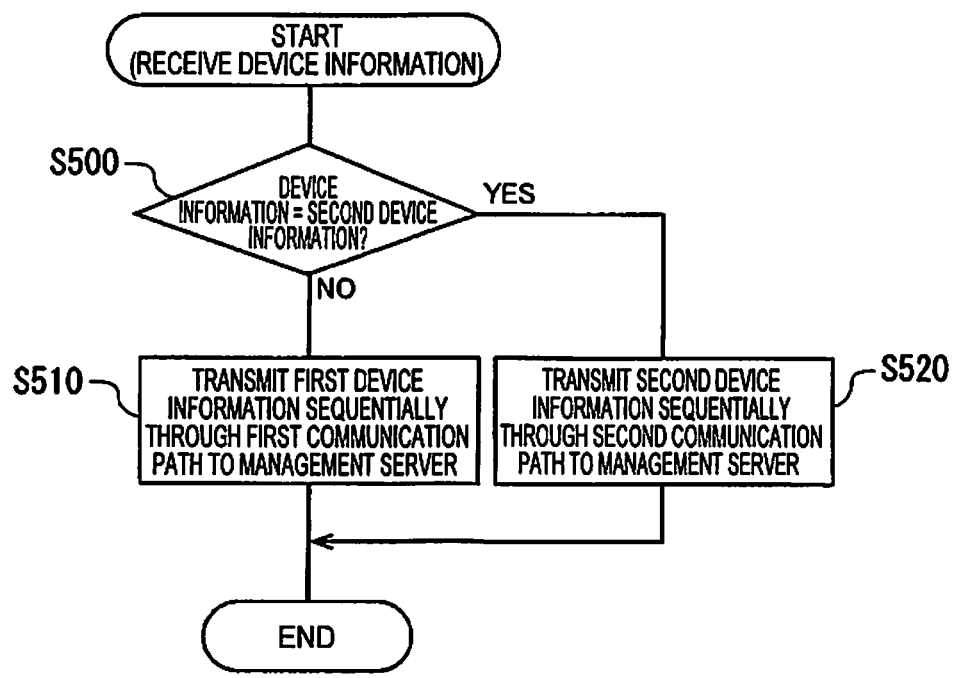
FIG. 5 is a flow chart of the transmission process executed by the data collection server.

FIG. 5 is a flow chart of the transmission process the controller 21 of the data collection server 20 executes according to the device information collection and transmission program 24.

Each time device information from a device 40 is received as described above through the communication interface 22, the controller 21 executes the process in FIG. 5.

Triggered by receiving device information from a device 40, the controller 21 determines whether the received device information is first device information that is not a priority transmission target, of second device information that is a priority transmission target (step S500).

More specifically, the controller 21 determines if the specific string indicating priority identification information is contained in the header of the received device information, and if the specific string is found, determines the device information is second device information (step S500: Yes). However, if the specific string is not found, the controller 21 determines the device information is not second device information (step S500: No). If the received device information is second device information, control goes to step S520. If the received device information is first device information, control goes to step S510.

In step S510, the controller 21 executes a process sending the first device information detected in step S500 sequentially to the management server 30 using a first communication path.

In step S520, the controller 21 opens a second communication path different from the first communication path, and executes a process sending the second device information detected in step S500 sequentially to the management server 30 using the second communication path.

Figure 6:
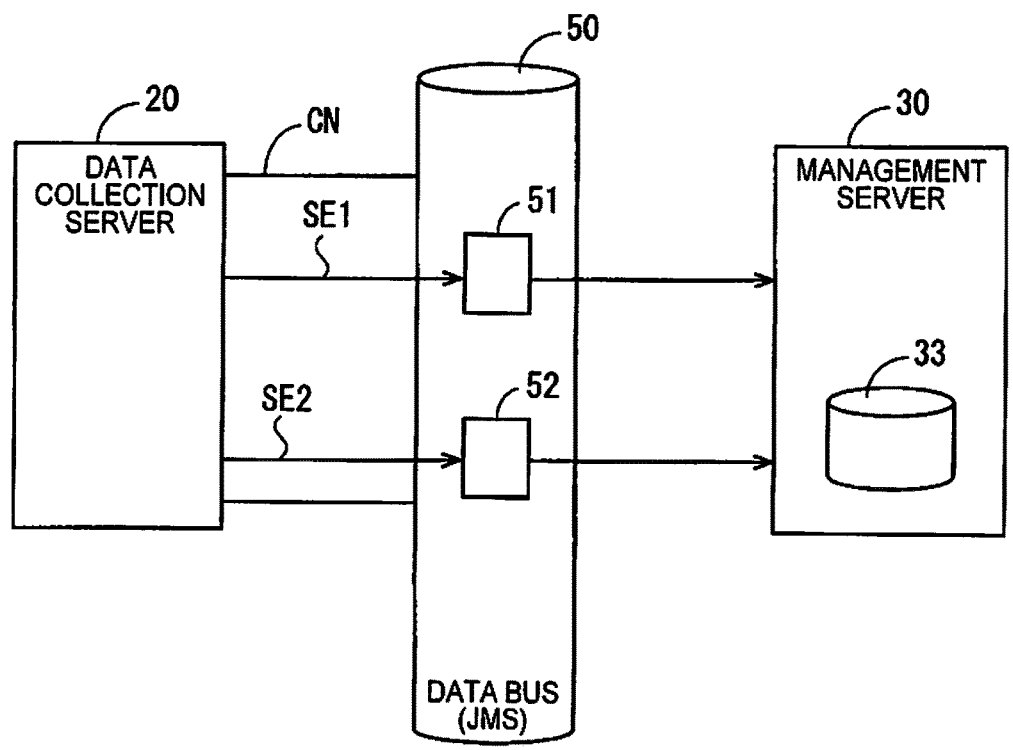
FIG. 6 schematically illustrates transmission between the data collection server, data bus, and management server.

FIG. 6 illustrates communication between the data collection server 20, data bus 50, and management server 30. In the example in FIG. 6, the data bus 50 is a means for implementing JMS (Java Message Service), and is a type of server (JMS server). The sender (data collection server 20) issues a message to an address called a topic or queue instantiated on the JMS server (data bus 50). An agreement to send messages sent by a specific topic to a JMS consumer is previously established between the receiver (management server 30) and the JMS server (data bus 50). As a result, if a message is issued from a sender, the message is passed through the JMS server to the receiver. Communication between the sender and JMS server, and communication between the JMS server and receiver, is asynchronous.

More specifically, the controller 21 of the data collection server 20 opens a connection CN to the data bus 50 (JMS server) by instantiating a connection object. The controller 21 also instantiates a session SE1 corresponding to the destination 51 created in the data bus 50. A session is a thread created through the connection CN. The session SE1 is an example of a first communication path. When the device information received from the device 40 is determined to be first device information (step S500: No), the controller 21 sends the first device information through the session SE1 as a message to the destination 51 on the data bus 50 (step S510). The controller 21 sends the first device information received at various times from different devices 40 through the session SE1 to the destination 51 of the data bus 50 in the order received. The first device information sent sequentially through the session SE1 is accumulated at the destination 51, and the first device information stored on the destination 51 is sent in FIFO order to the management server 30.

When the device information received from the device 40 is determined to be second device information (step S500: Yes), the controller 21 instantiates a session SE2 corresponding to the destination 52 created in the data bus 50 through the connection CN, and sends the second device information through the session SE2 as a message to the destination 52 (step S520). Session SE2 is an example of a second communication path. As a result, the second device information sent to the destination 52 is passed to the management server 30. Session SE2 is a dedicated communication path for transmitting second device information.

Suppose that the second device information is communicated through the same session SE1 as the first device information. In this event, the first device information the data collection server 20 received from another device 40 before receiving the second device information is transmitted before the second device information through the session SE1 to the destination 51 on the data bus 50. After the first device information stored first on the destination 51 is sent to the management server 30, the destination 51 also sends the second device information to the management server 30. In other words, if the second device information is transmitted through the same session SE1 as the first device information, communication of the second device information may be easily delayed by its relationship to the other first device information even though the second device information is information sent from the device 40 because the on-demand transmission button 48 was pressed, and it is difficult for the second device information to reach the management server 30 quickly. Such delays can easily occur particularly during times when multiple devices 40 in the system 10 are trying to send first device information to the data collection server 20.

However, by transmitting second device information through a session SE2 established separately from the session SE1 as described in this embodiment, communication delays resulting from the relationship to the first device information are prevented, and second device information can be transmitted quickly to the management server 30. A configuration using a first communication path and a second communication path can therefore greatly reduce the time required for second device information to reach the management server 30 after being received by the data collection server 20 compared with the time required for the first device information. As a result, the controller 21 may be said to prioritize sending second device information to the management server 30 over sending first device information.

In this embodiment, the device 40 transmits first device information to the data collection server 20 at a predetermined time (executes the scheduled transmission process), but when a specific user operation (pressing the on-demand transmission button 48) is detected, the device 40 transmits second device information, which can be differentiated from the first device information, to the data collection server 20 in response to the user operation. The data collection server 20 then receives device information, determines whether the received device information is first device information or second device information, and sends second device information to the management server 30 with priority over the first device information. This configuration thus appropriately meets the user desire to quickly send device information for a device 40 to the management server 30 (service provider).

For example, suppose the user discovers an error occurred on a particular device 40, wants to know how to resolve the error, and telephones an operator at the service provider. The operator then instructs the user to press the on-demand transmission button 48 on the device 40, and the user presses the on-demand transmission button 48 as requested. Triggered by operation of the on-demand transmission button 48, device information (second device information) sent from the device 40 to the data collection server 20 is quickly transmitted as described above from the data collection server 20 through the data bus 50 to the management server 30. As a result, while talking with the user over the telephone, the operator can review the device information (device information including error information in this example) transmitted in response to the user pressing the on-demand transmission button 48 on the operator's terminal 60, and can very quickly provide appropriate support (such as how to resolve the error) to the user.

By making the decision of step S500 described above, the controller 21 of the data collection server 20 can be said to function as an evaluator.

Furthermore, by receiving device information from the device 40 as described above and passing the device information to the management server 30, the controller 21 and communication interface 22 of the data collection server 20 can be said to function as a receiver and a transmitter.

4. Displaying the Number of Pages Printed by the Device

Another feature of this embodiment of the invention is that the device 40 stores a total printed page count, which is the cumulative number of pages printed in a past counting period and the current counting period, and the previous total printed page count, which is the cumulative number of pages printed until the last counting period; and based on the total printed page count and the previous total printed page count, displays the number of pages printed in the current counting period on a specific display (display 44).

An example in which each month is a counting period is described next.

A counting period is basically the unit of time for which the invoice amount is calculated and the user is billed. For example, if it is currently November 2016, November 2016 is the current counting period, and October 2016 is the previous counting period.

The device 40 also continuously updates and writes to memory 43 the total number of color pages and the total number of monochrome pages printed by the print unit 46 as one type of consumables information. The total number of color printed pages is the total number of color pages the device 40 printed from when it was shipped from the factory to the present, and the total number of monochrome printed pages is the total number of monochrome pages the device 40 printed from when it was shipped from the factory to the present. In this embodiment, the device 40 also writes and stores in memory 43 the previous total printed page count, which is the total printed page count through the previous counting period. For example, if it is November 2016, the sum of the total number of color printed pages and the total number of monochrome printed pages at the end of October 2016 (the previous counting period) is stored as the previous total printed page count (the total printed page count at the end of the last month). The device 40 also sends the total printed page count (current total printed page count) and the previous total printed page count (the total printed page count at the end of the last month) as consumables information included in the device information to the data collection server 20.

FIG. 7 shows an example of the change in the printed page counts of a particular device (printer) 40 together with when (date and time) the device 40 transmitted the device information (executed the scheduled transmission process and on-demand transmission process). In the example in FIG. 7, the device 40 executed the scheduled transmission process at 15:00 on Oct. 31, 2016; executed the on-demand transmission process at 20:00 the same day; and executed the scheduled transmission process at 15:00 the next day (Nov. 1, 2016). Note that the times 15:00 and 20:00 shown in FIG. 7 indicate the time included in the device information indicating when the device information was generated.

Information indicating 2900 monochrome pages and 1400 color pages as the current total printed page counts is included in the device information transmitted by the scheduled transmission process at 15:00 on Oct. 31, 2016. Information indicating that both counts increased 100 and the current total printed page counts are 3000 monochrome pages and 1500 color pages is included in the device information transmitted by the on-demand transmission process at 20:00 the same day. Because on Oct. 31, 2016 the previous counting period is September 2016, the total printed page counts at the end of the last month (2000 monochrome, 1000 color) recorded on October 31 in FIG. 7 mean the total printed page counts at the end of September 2016.

The displayed page counts in FIG. 7 indicate the content the device 40 presents on the display 44. For example, by calculating the difference between the current total printed page count (2900 monochrome, 1400 color) and the total printed page count at the end of the last month (2000 monochrome, 1000 color), the device 40 that executed the scheduled transmission process at 15:00, Oct. 31, 2016, displays 900 monochrome, 400 color as the page counts (the page counts for the current counting period (October 2016)) on the display 44.

By calculating the difference between the current total printed page count (3000 monochrome, 1500 color) and the total printed page count at the end of the last month (2000 monochrome, 1000 color), the device 40 that executed the on-demand transmission process at 20:00, Oct. 31, 2016, displays 1000 monochrome, 500 color as the page counts (the page counts for the current counting period (October 2016)) on the display 44.

The user can therefore know from the display 44 the number of monochrome and color pages printed to that point in the current month.

In the example in FIG. 7, the on-demand transmission process executed at 20:00, Oct. 31, 2016 is the last device information transmission process the device 40 executed in October 2016. As a result, the current total printed page count (3000 monochrome, 1500 color) included in the device information transmitted in the on-demand transmission process becomes the total printed page count at the end of the last month in the next month (November 2016). Therefore, by calculating the difference between the current total printed page count (3100 monochrome, 1600 color) and the total printed page count at the end of the last month (3000 monochrome, 1500 color), the device 40 that executed the scheduled transmission process at 15:00 on Nov. 1, 2016 displays 100 monochrome, 100 color as the page counts (the page counts for the current counting period (November 2016)) on the display 44.

The billing unit 35 of the management server 30 calculates the invoice amount for the counting period based on the last device information the device 40 generated during the counting period. In the example in FIG. 7, the last device information generated in October 2016 is the device information generated by the on-demand transmission process at 20:00 on the 31$^{st}$. As a result, by calculating the difference between the current total printed page count (3000 monochrome, 1500 color) included in the device information transmitted in the on-demand transmission process at 20:00, October 31, and the total printed page count at the end of the last month (2000 monochrome, 1000 color), the device 40 calculates the invoice amount for 1000 monochrome and 500 color pages.

As described above, the time kept by each device 40 is corrected based on the time received from the data collection server 20 before transmitting the device information (step S320 in FIG. 3). As a result, by comparing the time information contained in the device information transmitted from a device 40 in the scheduled transmission process and on-demand transmission process, the management server 30 can reliably determine which device information is newer (older). By thus accurately determining what device information is most recent, the management server 30 (service provider) can provide more accurate invoicing and device 40 support services, for example.

Furthermore, correcting the time kept by each device 40 based on the time kept by the data collection server 20 helps reduce the load on the data collection server 20. The specific time set as the start time of the scheduled transmission process of each device 40 may be deliberately set differently for different devices 40 so that device information transmission to the data collection server 20 is not concentrated in a single period. If each device 40 operates (executes the scheduled transmission process, for example) based solely on the time kept by the device 40, the desired effect of varying the specific time the transmission executes may be reduced. By correcting the time kept by each device 40 so that all devices 40 in the system 10 operate referenced to a common time (the time kept by the data collection server 20) in this embodiment of the invention, the effect of varying the scheduled transmission time by each device 40, that is, the effect of dispersing the load on the data collection server 20 that receives the device information, can be reliably achieved.

5. Other Embodiments

The invention is not limited to the embodiments described above.

A combination of a device 40 and a PC or other computer (user terminal) that monitors and controls one or more devices 40 may be applied in the system 10 shown in FIG. 1. More specifically, a device monitoring program 47, or an application with functionality equivalent to the device monitoring program 47, may be installed on the user terminal. The user terminal then acquires consumables information and error information from the monitored devices 40, generates device information, and sends the device information to the data collection server 20. The user terminal may also execute a scheduled transmission process and on-demand transmission process related to the monitored devices 40. In this case, the on-demand transmission button 48 is provided in the user interface (not shown in the figure) provided to the user by the user terminal.

A device 40 and a user terminal together may also be considered a device according to the invention.

Information provided for the user on the display 44 of the device 40 described above (the on-demand transmission button 48, content displayed in steps S230, S260 (FIG. 4), the page counts displayed for the current counting period) may be displayed on the display of a PC or other computer connected to the device 40. For example, the device 40 may function as a type of server on the network NW, and provide a web page for displaying information. By accessing the web page by a function of an installed browser, an external PC or other device provides the on-demand transmission button 48, content displayed in steps S230, S260 (FIG. 4), and the page counts displayed for the current counting period for the user on a screen, and receives user operations, such as operation of the on-demand transmission button 48, through the displayed interface.

The user may also be able to cancel the on-demand transmission process. For example, a cancel on-demand transmission button may be provided with the on-demand transmission button 48 on the display 44 of the device 40, a display other than the display 44, or other screen that can be operated by the user. The cancel on-demand transmission button is enabled, for example, during communication between the device 40 and data collection server 20 in step S210 (FIG. 4) after the on-demand transmission button 48 is pushed. If the enabled cancel on-demand transmission button is then pushed by the user, the device 40 cancels the on-demand transmission process (FIG. 4).

FIG. 6 describes sessions SE1 and SE2 as specific examples of a first communication path and second communication path, but the connection CN including a session may also be a communication path unit. In other words, multiple connections instantiated between the data collection server 20 and data bus 50 may be used as the first communication path and second communication path to transmit device information.

The method whereby the data collection server 20 (controller 21) prioritizes transmission of second device information over first device information to the management server 30 is not limited to methods using a first communication path and second communication path as described above. For example, the controller 21 may send both first device information and second device information to the management server 30 through the same communication path (first communication path). In this configuration, if the device information received from the device 40 is second device information, the controller 21 sends the second device information through the communication path to the management server 30 before all other first device information that was received before the second device information and has not yet been sent to the management server 30.

In the embodiment described above, the data collection server 20 receive the first device information and second device information through the communication interface 22, but a first communication interface for receiving first device information, and a second communication interface for receiving second device information, may be separately provided. In this case, the first device information received through the first communication interface may be sent by a first communication path to the management server 30, and second device information received by the second communication interface may be sent to the management server 30 through a prioritized second communication path.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A data collection server configured to connect to and communicate with a management server that manages a device, the data collection server comprising:
   a receiver that receives device information related to device states;
   an evaluator configured to determine if the received device information is first device information that is not an object of priority transmission, or second device information that is an object of priority transmission; and
   a transmitter configured to send the received device information to the management server, and send the second device information to the management server with priority over the first device information,
   the receiver receiving the first device information from multiple devices, and
   the transmitter sequentially sending the first device information received from the multiple devices through a first communication path to the management server, and sending the second device information to the management server using a second communication path different from the first communication path.

2. The data collection server described in claim 1, wherein:
   the evaluator determines the received device information is the second device information when specific identification information indicating an object of priority transmission is contained in the received device information.

3. A data collection and transmission system comprising:
   multiple devices each of which is configured to transmit device information related to a state of each of the devices; and
   a data collection server including
      a receiver configured to receive the device information,
      an evaluator configured to determine if the received device information is first device information that is not an object of priority transmission, or second device information that is an object of priority transmission; and
      a transmitter configured to send the received device information to a management server that manages the device information and send the second device information to the management server with priority over the first device information,
   the receiver receiving the first device information from the multiple devices, and
   the transmitter sequentially sending the first device information received from the multiple devices through a first communication path to the management server, and sending the second device information to the management server using a second communication path different from the first communication path.

* * * * *